(12) United States Patent
Matoba et al.

(10) Patent No.: US 6,269,183 B1
(45) Date of Patent: Jul. 31, 2001

(54) IMAGE PROCESSING DEVICE AND STILL IMAGE PICKUP DEVICE, AND METHOD FOR PROCESSING IMAGE

(75) Inventors: Narihiro Matoba; Masayuki Saito, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/171,100

(22) PCT Filed: Mar. 20, 1998

(86) PCT No.: PCT/JP98/01214

§ 371 Date: Oct. 13, 1998

§ 102(e) Date: Oct. 13, 1998

(87) PCT Pub. No.: WO98/43440

PCT Pub. Date: Oct. 1, 1998

(30) Foreign Application Priority Data

Mar. 21, 1997 (JP) .................................................... 9-068788

(51) Int. Cl.⁷ .................................. G06K 9/00; G06K 9/36
(52) U.S. Cl. ............................................................. 382/166
(58) Field of Search .................................. 382/166, 232, 382/237, 239, 243, 251, 162, 233, 205; 348/386, 387, 390, 391, 404, 405, 420; 358/539, 426, 433, 261.2, 261.3; 341/50, 51, 61, 95, 97, 98, 106

(56) References Cited

U.S. PATENT DOCUMENTS

| 5,706,103 | 1/1998 | Matoba et al. ........................ 358/426 |
| 5,727,087 | 3/1998 | Matoba et al. ........................ 382/234 |
| 5,734,779 | * 3/1998 | Okino ..................................... 386/38 |

FOREIGN PATENT DOCUMENTS

| A1 4-409066 | 9/1994 | (DE) ............................... G06T/5/66 |
| 4-170886 | 6/1992 | (JP) ............................... H04N/9/07 |
| 4-298170 | 10/1992 | (JP) ............................... H04N/5/225 |
| 5-7340 | 1/1993 | (JP) ............................... H04N/5/335 |
| 6-54209 | 2/1994 | (JP) ............................... H04N/1/415 |
| 6-90435 | 3/1994 | (JP) ............................... H04N/5/93 |

* cited by examiner

*Primary Examiner*—Phuoc Tran

(57) ABSTRACT

Output signals of a predetermined number of pixels composed of a plurality of color components intermixed are rearranged into a set of unit blocks, each composed of output signal components of the same color, then the thus rearranged image signals are encoded into fixed-length codes for each unit block, then the image signals thus encoded into fixed-length codes are stored in a coded image memory, then the image signals stored therein are read out and decoded into fixed-length form for each unit block, and the decoded image signals are reversely rearranged to restore the original signals, which are stored in a frame memory.

26 Claims, 16 Drawing Sheets

|   | 1 | 2 | 3 | 4 | 5 | 6 | 7 | 8 |
|---|---|---|---|---|---|---|---|---|
| 1 | G11 | R12 | G13 | R14 | G15 | R16 | G17 | R18 |
| 2 | B21 | G22 | B23 | G24 | B25 | G26 | B27 | G28 |
| 3 | G31 | R32 | G33 | R34 | G35 | R36 | G37 | R38 |
| 4 | B41 | G42 | B43 | G44 | B45 | G46 | B47 | G48 |
| 5 | G51 | R52 | G53 | R54 | G55 | R56 | G57 | R58 |
| 6 | B61 | G62 | B63 | G64 | B65 | G66 | B67 | G68 |
| 7 | G71 | R72 | G73 | R74 | G75 | R76 | G77 | R78 |
| 8 | B81 | G82 | B83 | G84 | B85 | G86 | B87 | G88 |

⇩

(2)

|   | 1 | 2 | 3 | 4 | 5 | 6 | 7 | 8 |
|---|---|---|---|---|---|---|---|---|
| 1 | G11 | G22 | G13 | G24 | R12 | R14 | R16 | R18 |
| 2 | G31 | G42 | G33 | G44 | R32 | R34 | R36 | R38 |
| 3 | G51 | G62 | G53 | G64 | R52 | R54 | R56 | R58 |
| 4 | G71 | G82 | G73 | G84 | R72 | R74 | R76 | R78 |
| 5 | B21 | B23 | B25 | B27 | G15 | G26 | G17 | G28 |
| 6 | B41 | B43 | B45 | B47 | G35 | G46 | G37 | G48 |
| 7 | B61 | B63 | B65 | B67 | G55 | G66 | G57 | G68 |
| 8 | B81 | B83 | B85 | B87 | G75 | G86 | G77 | G88 |

(2) CODING PROCEDURE (1/2)

FIG.10
(1)
|   | 1 | 2 | 3 | 4 | 5 | 6 | 7 | 8 |
|---|---|---|---|---|---|---|---|---|
| 1 | G11 | G22 | G13 | G24 | G12 | G14 | G16 | G18 |
| 2 | G31 | G42 | G33 | G44 | G32 | G34 | G36 | G38 |
| 3 | G51 | G62 | G53 | G64 | G52 | G54 | G56 | G58 |
| 4 | G71 | G82 | G73 | G84 | G72 | G74 | G76 | G78 |
| 5 | B21 | B23 | B25 | B27 | G15 | G26 | G17 | G28 |
| 6 | B41 | B43 | B45 | B47 | G35 | G46 | G37 | G48 |
| 7 | B61 | B63 | B65 | B67 | G55 | G66 | G57 | G68 |
| 8 | B81 | B83 | B85 | B87 | G75 | G86 | G77 | G88 |
Upper-left quadrant: G1; Upper-right: R1; Lower-left: B1; Lower-right: G2
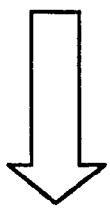
(2)
| G1e | R1e | B1e | G2e |

FIG.11
(1)
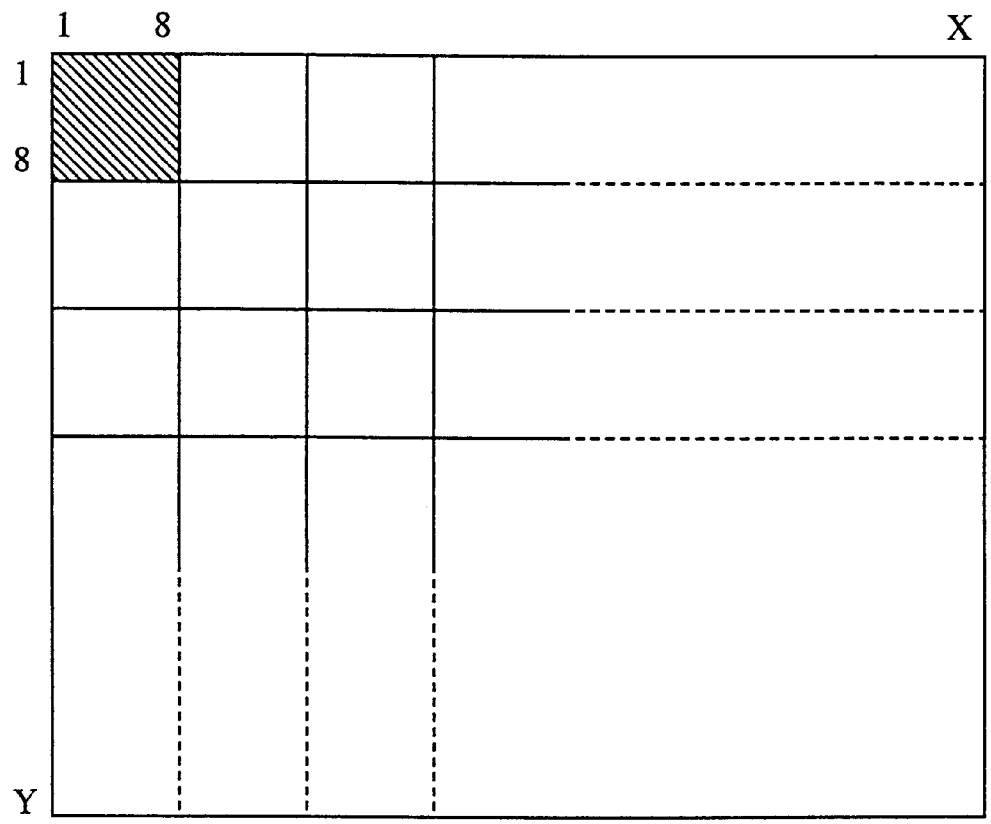
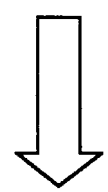
(2)
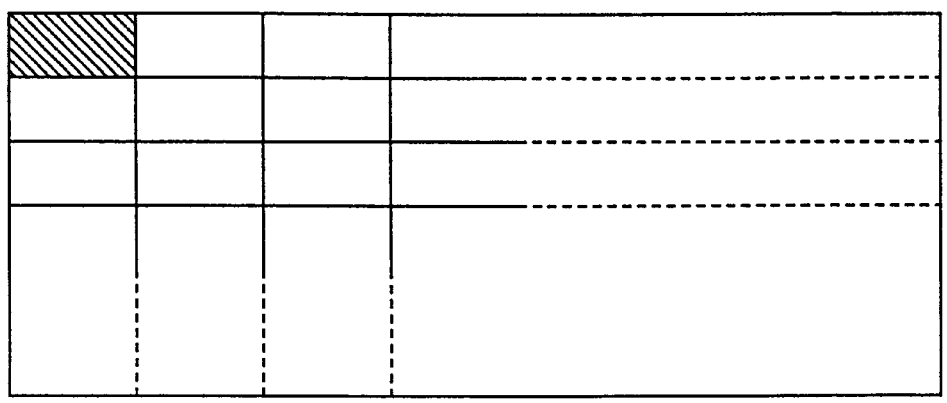

MEMORY CAPACITY NECESSARY FOR STORING ORIGINAL IMAGES AND CODED DATA PER BLOCK

| CODE CONTENTS | 8-BIT IMAGE bits / block (bytes / block) | 10-BIT IMAGE bits / block (bytes / block) | 10-BIT IMAGE bits / block (bytes / block) |
|---|---|---|---|
| AVERAGE VALUE LEVEL (LA) | 8 (1byte) | 10 (2bytes) | 20 (3bytes) |
| GRAY SCALE SPAN (LD) | 8 (1byte) | 10 (2bytes) | |
| QUANTIZATION LEVEL ($\Phi_{ijk}$) | 48 (6bytes) | 48 (6bytes) | 48 (6bytes) |
| TOTAL MEMORY CAPACITY NECESSARY FOR STORING CODED DATA | 64 (8bytes) | 68 (10bytes) | 68 (9bytes) |
| MEMORY CAPACITY NECESSARY FOR STORING ORIGINAL IMAGES | 128 (16bytes) | 160 (32bytes) | 160 (20bytes) |
| | | NO BITS PACKED (EXCEPT $\Phi_{ijk}$) | BITS PACKED |

(2)

◇ 8-BIT IMAGE : 8bytes

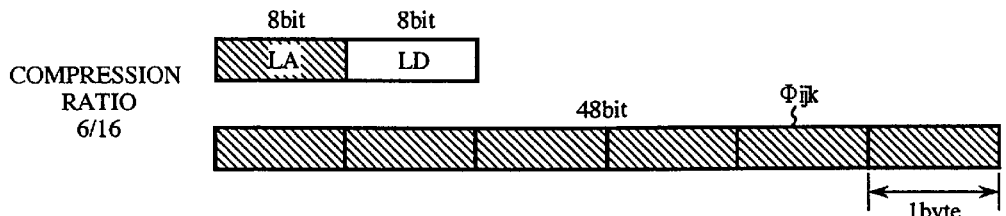

COMPRESSION RATIO 6/16

◇ 10-BIT IMAGE / NO BITS PACKED (EXCEPT $\Phi_{ijk}$) 10bytes

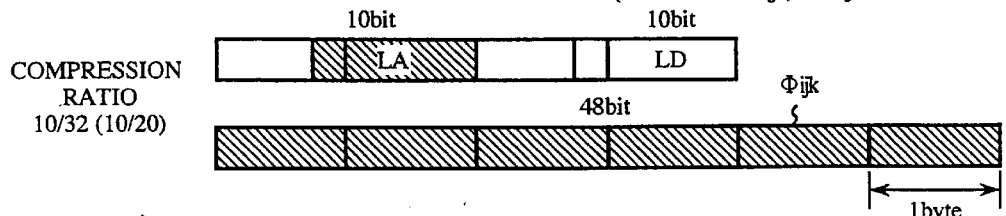

COMPRESSION RATIO 10/32 (10/20)

◇ 10-BIT IMAGE / BITS PACKED 8bytes

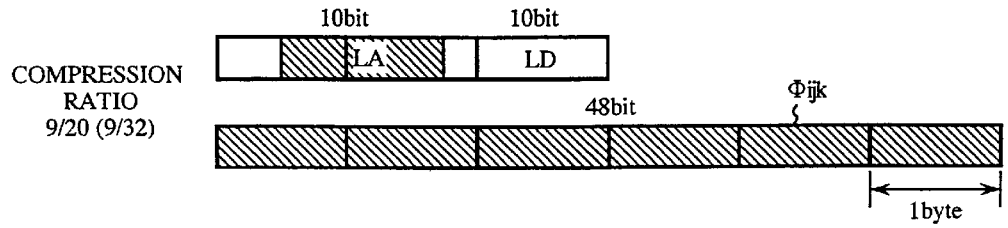

COMPRESSION RATIO 9/20 (9/32)

FIG.13

MEMORY CAPACITY NECESSARY FOR STORING
ORIGINAL IMAGES AND CODED DATA IN VGA (640×480)

| CODE CONTENTS | 8-BIT IMAGE bits/flame (bytes/flame) | 10-BIT IMAGE bits/flame (bytes/flame) | 10-BIT IMAGE bits/flame (bytes/flame) |
|---|---|---|---|
| AVERAGE VALUE LEVEL (LA) | 153600 (19200bytes) | 192000 (38400bytes) | 384000 (57600bytes) |
| GRAY SCALE SPAN (LD) | 153600 (19200bytes) | 192000 (38400bytes) | |
| QUANTIZATION LEVEL (Φijk) | 921600 (115200bytes) | 921600 (115200bytes) | 921600 (115200bytes) |
| TOTAL MEMORY CAPACITY NECESSARY FOR STORING CODED DATA | 1228800 (153600bytes) | 1205600 (192000bytes) | 1305600 (172800bytes) |
| MEMORY CAPACITY NECESSARY FOR STORING ORIGINAL IMAGES | 2457600 (307200bytes) | 3072000 (614400bytes) | 3072000 (384000bytes) |
| | NO BITS PACKED | (BITS PACKED FOR ONLY QUANTIZATION LEVEL) | BITS PACKED |

FIG.15

IMAGE PROCESSING DEVICE AND STILL IMAGE PICKUP DEVICE, AND METHOD FOR PROCESSING IMAGE

This application is the national phase under 35 U.S.C. §371 of prior PCT International Application No. PCT/JP98/01214 which has an International filing date of Mar. 20, 1998 which designated the United States of America, the entire contents of which are hereby incorporated by reference.

TECHNICAL FIELD

The present invention relates to an image processor, a static image pick-up device and an image processing method whereby output signals of a predetermined number of pixels, outputted with a plurality of color components intermixed, are encoded into compressed forms and then stored in a memory.

BACKGROUND ART

There has heretofore been employed a static image pick-up device. of the type that produces three color image signals by means of red (hereinafter identified simply by R), green (hereinafter identified simply by G) and blue (hereinafter identified simply by B) color filters provided in a single-plate or single-tube image pick-up device. Such a static image pick-up device performs pixel interpolation processing through the use of adjacent pixel signals so as to obtain three color signals for each pixel. In the pixel interpolation processing, data is easier to process as a digital signal, but digitization of image signals as they are will involve an enormous amount of information; hence, it is customary to carry out signal compression through utilization of the redundancy of video signals with a view to saving the storage capacity of a coded image memory for recording image signals and the signal transmission time. Since it is effective in the pixel interpolation to process the three color signals of different characteristics individually according to color, the signal compression is conventionally performed using a coding circuit provided for each color, that is, using coding circuits of three lines.

By the way, such a static image pick-up device involves complex processing for signal compression and has shortcomings of prolonged computing time and increased power consumption accordingly. To solve these problems, a static image pick-up device disclosed in Japanese Pat. Appln. Laid-Open Gazette No. 4-170886 adopts a method which carries out signal compression by a coding circuit of one line after extracting the color image signals for each color.

FIG. 18 is a diagram depicting a color signal extracting method of the static image pick-up device disclosed in the above-mentioned Japanese Pat. Appln. Laid-Open Gazette No. 4-170886. In FIG. 18, reference numeral 20 denotes an imaging device covered all over the surface thereof with strip-like color filters of three colors; 21a denotes an R component derived from the output signal of the imaging device 20; 21b denotes a G component derived from the output signal of the imaging device 20; and 21c denotes a B component derived from the output signal of the imaging device 20.

The static image pick-up device disclosed in Japanese Pat. Laid-Open Gazette No. 4-170886 extracts output signals of the respective color components R, G and B individually from the imaging device 20, then converts them into digital signals, and sequentially compresses the digital signals by a coding circuit of one line, thereafter recording them on a floppy disk, IC card or similar coded image memory for each color.

In the static image pick-up device disclosed in Japanese Pat. Laid-Open Gazette No. 4-170886 with such a construction as described above, it is necessary to read out the image signals directly from the imaging device for each color—this requires the provision of a dedicated imaging device from which image signals can be read out directly for each color and dedicated hardware therefor.

Since only one line of coding circuit suffices for the traditional static image pick-up device, its construction is simplified accordingly; however, the coded image memory needs to store all color signal components of one frame, and hence it is required to have a large storage capacity.

When the static image pick-up device is formed using an image processor, the amount of data that can be stored in the coded image memory is limited, so that large amounts of data cannot be processed in succession—this gives rise to a problem that high-speed continuous shooting is impossible.

Furthermore, when the static image pick-up device is formed using the image processor, no high definition reproduced images can be created because of limitations on the reduction of the area of one pixel of an imaging device using a CCD (Charge Coupled Device) or the like.

Moreover, when the static image pick-up device is formed using the image processor, it necessarily takes a certain amount of time to display reproduced pictures because coding and decoding of image signals consume predetermined amounts of time.

The present invention is intended to solve such problems as mentioned above and to provide a static image pick-up device which enables color image signals to be read out for each color through the use of an ordinary imaging device.

Another object of the present invention is to provide an image processor and an image processing method which can be realized using only one line of coding circuit and a small capacity coded image memory.

Another object of the present invention is to provide a static image pick-up device which permits high-speed continuous shooting.

Another object of the present invention is to provide a static image pick-up device which creates high definition reproduced images.

Still another object of the present invention is to provide a static image pick-up device which produces a high-speed display of reproduced pictures.

BRIEF SUMMARY

The image processor according to the present invention comprises: pixel rearrangement means for rearranging image signals of a predetermined number of pixels composed of a plurality of color components intermixed into a set of unit blocks, each consisting of image signal components of a same color; fixed-length coding means for encoding the image signals rearranged by the pixel rearrangement means into fixed-length codes for each unit block; and a coded image memory for storing the image signals encoded by the fixed-length coding means into fixed-length codes.

With such a construction, image signals of a plurality of intermixed color components in a block can be rearranged by a small capacity line buffer into unit blocks each consisting of the same color components present at adjacent positions, and coding can be achieved using only color image signal data for each color; furthermore, the image processor can be realized using a coding circuit of one line and a small capacity coded image memory. Additionally, a large amount of image data can be stored in the coded image memory without necessitating any particular increase in its capacity, by which high-speed continuous shooting becomes possible.

In the image processor according to the present invention the fixed-length coding means performs fixed-length coding at different compression ratios for each color component.

This ensures efficient coding according to the characteristic of each color component and permits further reduction of the capacity of the coded image memory.

The image processor according to the present invention further comprises a selector provided at a stage preceding the coded image memory, the selector outputting fixed-length coded and non-fixed-length coded image signals selectively.

This makes it possible to change the display system on the display device according as high-speed continuous shooting is performed or not.

In the image processor according to the present invention, the pixel rearrangement means comprises two line buffers, each having 2m lines, when the unit block is formed as a pixel block with m rows and n columns (where m and n are natural numbers).

This permits reduction of the capacity of each line buffer.

In the image processor according to the present invention, the above-mentioned m is 4.

This also permits reduction of the line buffer capacity.

In the image processor according to the present invention, the above-mentioned m is 2a (where a is a natural number) and the pixel arrangement means rearranges the image signals so that the unit block as a rows and 2n columns.

This permits further reduction of the line buffer capacity.

In the image processor according to the present invention, the above-mentioned m is 2a (where a is a natural number) and the pixel rearrangement means rearranges each of the red and blue image signals so that the unit block has a rows and 2n columns, and rearranges the green image signal so that the unit block has 2a rows and n columns.

This also permits further reduction of the line buffer capacity without degrading the display image.

The image processor according to the present invention further comprises: fixed-length decoding means for reading out the image signals stored in the coded image memory to decode them into fixed-length form; pixel reverse-rearrangement means for restoring the image signals decoded by the fixed-length decoding means to an original sequence by rearranging them in a sequence reverse to that by the pixel rearrangement means; and signal processing means for processing the image signals of the original sequence restored by the pixel reverse-rearrangement means.

This produces an effect that the fixed-length coded image signals can be reproduced and displayed.

The image processor according to the present invention further comprises a frame memory for storing the image signals processed by the signal processing means.

This permits implementation of fixed-length coding, pixel reverse-rearrangement, signal processing and variable-length coding by software, and hence offers advantages over hardware processing in terms of versatility, flexibility and costs.

The image processor according to the present invention further comprises display means for displaying the image signals processed by the signal processing means.

This produces an effect that the reproduced image can immediately provided on the display means.

In the image processor according to the present invention, the signal processing means reads out only part of the fixed-length coded image signals stored in the coded image memory to display it on the display means without decoding it.

This permits very fast image display and production of a multi-frame display.

The static image pick-up device according to the present invention comprises single-plate or single-tube imaging means provided with color filters of plural colors, for picking up an image of a subject to output image signals having a plurality of color components intermixed therein; pixel rearrangement means for rearranging the image signals of a predetermined number of pixels, output from the imaging means, into a set of unit blocks, each consisting of image signal components of a same color; fixed-length coding means for encoding the image signals, rearranged by the pixel rearrangement means, into fixed-length codes for each unit block; and a coded image memory for storing the image signals encoded by the fixed-length coding means.

With such a configuration, the image pick-up device need not be capable of special readout, and coding can be achieved using only color image signal data for each color; furthermore, the image processor can be realized using a coding circuit of one line and a small capacity coded image memory. Additionally, a large amount of image data can be stored in the coded image memory without involving any particular increase in its capacity, by which high-speed continuous shooting becomes possible. Moreover, when images preceding and following those continuously picked up by continuous shooting are shifted by 1/c pixel to increase the number of pixels, it is possible to obtain the same effect as is obtainable with c-fold resolution of the image pick-up device—this permits production of a high definition image.

The static image pick-up device according to the present invention further comprises: fixed-length decoding means for reading out the image signals stored in the coded image memory to decode them into fixed-length form; pixel reverse-rearrangement means for restoring the image signals decoded by the fixed-length decoding means to an original sequence by rearranging them in a sequence reverse to that by the pixel rearrangement means; and signal processing means for processing the image signals of the original sequence restored by the pixel reverse-rearrangement means.

This produces an effect that the fixed-length coded image signals can be reproduced and displayed.

The static image pick-up device according to the present invention further comprises a frame memory for storing the image signals processed by the signal processing means.

This permits implementation of fixed-length coding, pixel reverse-rearrangement, signal processing and variable-length coding by software, and hence offers advantages over hardware processing in terms of versatility, flexibility and costs.

The image processing method according to the present invention comprises the steps of: rearranging image signals of a predetermined number of pixels composed of a plurality of color components intermixed into a set of unit blocks, each consisting of image signal components of a same color; encoding rearranged image signals into fixed-length codes for each unit block.

With such a method, coding can be achieved using only color image signal data for each color; furthermore, this method can be realized using a coding circuit of one line and a small capacity coded image memory. Additionally, a large amount of image data can be stored in the coded image memory without involving any particular increase in its capacity, by which high-speed continuous shooting becomes possible.

The image processing method according to the present invention further comprises the steps of: decoding the image signals encoded into fixed-length codes; and restoring decoded image signals to an original sequence by rearranging them in a sequence reverse to that in rearranging.

This produces an effect that the fixed-length coded image signal can be reproduced and displayed.

BRIEF DESCRIPTION OF THE DRAWINGS

FIG. 5 is a diagram showing the results of rearrangement by the pixel rearrangement circuit in Embodiment 1 of the present invention.

FIG. 10 is a diagram showing how image data of each unit block encoded by the fixed-length coding circuit in Embodiment 1 of the present invention is stored in a coded image memory.

FIG. 11 is a diagram showing the state of storage for each unit block for the entire image of one field in the case of FIG. 9.

FIG. 12 is a diagram showing the storage capacity necessary for storing data encoded by the fixed-length coding circuit in the coded image memory in Embodiment 1 of the present invention.

FIG. 13 is a diagram showing the storage capacity necessary for storing image signals of one frame in a coded image memory, which conforms to VGA Standard, in Embodiment 1 of the present invention.

FIG. 15 is a diagram showing the results of rearrangement of color image data in a line buffer of a rearrangement circuit of a static image pick-up device according to Embodiment 2 of the present invention.

DETAILED DESCRIPTION

A more detailed description will be given, with reference to the accompanying drawings, of the best mode for carrying out the invention.

EMBODIMENT 1

Figure 1:
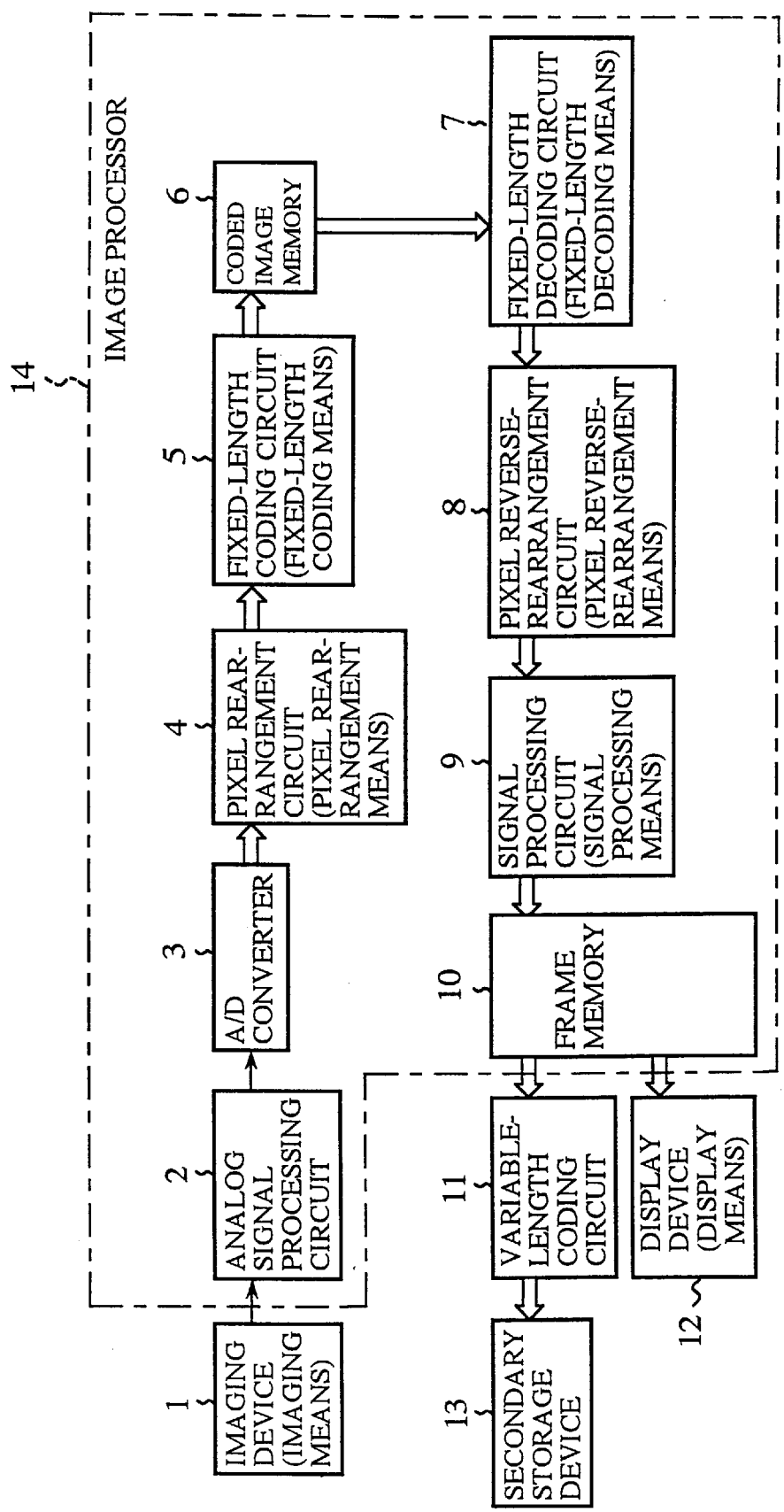
FIG. 1 is a block diagram illustrating a static image pick-up device according to Embodiment 1 of the present invention.

FIG. 1 is a block diagram illustrating a static image pick-up device according to Embodiment 1 of the present invention. In FIG. 1, reference numeral 1 denotes a CCD or like single-plate imaging device (an image sensing device) which is provided with color filters of plural colors and from which pixel signals are output on a dot sequential basis; 2 denotes an analog signal processing circuit which performs amplification, filtering and other processing of the output signals from the imaging device 1; 3 denotes an A/D converter for converting analog signals from the analog signal processing circuit 2 into digital signals; 4 denotes a pixel rearrangement circuit (pixel rearrangement means) which rearranges output signals of pixels of R, G and B color components, provided from the A/D converter 3, and outputs them as unit blocks for coding for each color component; 5 denotes a fixed-length coding circuit (fixed-length coding means) which performs fixed-length coding of an FBTC (Fixed Block Truncation Coding) system for each block of color signals rearranged by the pixel rearrangement circuit 4; 6 denotes a coded data memory for storing coded data which is output from the fixed-length coding circuit.

Reference numeral 7 denotes fixed-length decoding circuit (fixed-length decoding means) which reads out the coded data from the coded data memory 6 and decodes it into fixed-length data; 8 denotes a pixel reverse-rearrangement circuit (pixel reverse-rearrangement means) by which the data decoded by the fixed-length decoding circuit 7 is rearranged into a sequence reverse to that by the pixel rearrangement circuit 4 so that pixel signals are rearranged in the same sequence as that when read out in the scanning-line direction; 9 denotes a signal processing circuit (signal processing means) by which the image data restored by the pixel reverse-rearrangement circuit 8 to the original sequence is subjected to such corrections as pixel interpolation, gray scale correction and γ-correction; 10 denotes a frame memory for storing the signals corrected by the signal processing circuit 9; 11 denotes a variable-length coding circuit which reads out the data stored in the frame memory 10 and, for secondary storage, codes it by a JPEG (Joint Photographic Experts Group) system or like variable-length coding system; 12 denotes a CRT or like display device (display means) for displaying thereon an image formed on the basis of the data read out of the frame memory 9; 13 denotes a floppy disk, hard disk, flash memory or similar secondary storage device. The analog signal processing circuit 2, the A/D converter 3, the pixel rearrangement circuit 4, the fixed-length coding circuit 5, the coded data memory 6, the fixed-length decoding circuit 7, the pixel reverse-rearrangement circuit 8, the signal processing circuit 9, and the frame memory 10 constitute an image processor 14.

Figure 2:
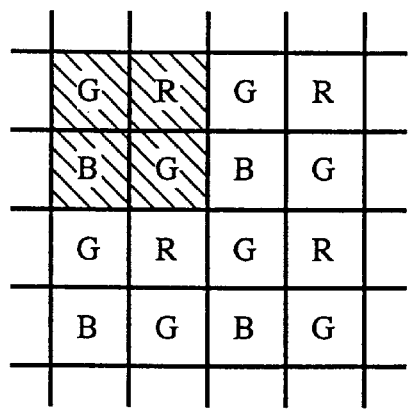
FIG. 2 is a diagram showing the color arrangement of a color filter coated over the entire area of an image-sensing light incident surface of the imaging device 1 of Embodiment of the present invention.
Figure 3:
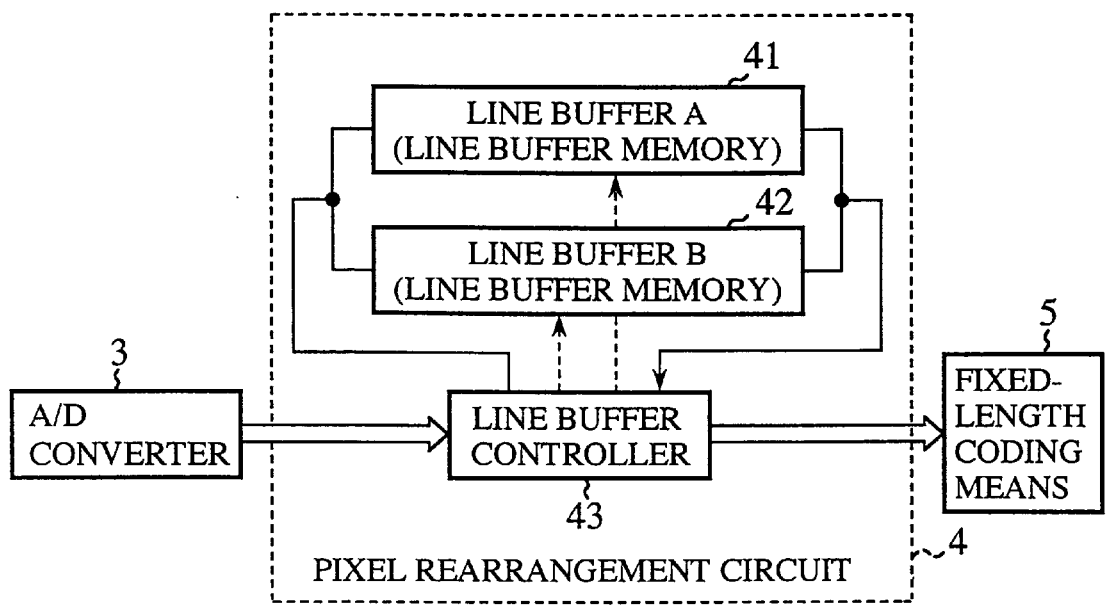
FIG. 3 is a block diagram depicting the internal configuration of a pixel rearrangement circuit in Embodiment 1 of the present invention.

FIG. 2 shows the color arrangement of a color filter coated over the entire area of an image sensing light incident surface of the imaging device 1 of Embodiment 1 of the present invention; G, R and B color components are arranged mosaically and 4 pixels, composed of 2 pixels in a column and 2 pixels in a row, form the minimum unit of the color array pattern. FIG. 3 is a block diagram depicting the internal configuration of the pixel rearrangement circuit 4. In FIG. 3, reference numeral 41 denotes a line buffer A (a line buffer memory) capable of storing image data of eight lines, and 42 denotes a line buffer B (a line buffer memory) also capable of storing image data of eight lines, the line buffers A41 and B42 make up a toggle line buffer. Reference numeral 43 denotes a line buffer controller for controlling write and read operations of the line buffers A41 and B42.

Next, the operation of this embodiment will be described below.

In the first place, the imaging device 1 picks up the image of a subject, and outputs image signals corresponding to the incident light, filtered by the color filter shown in FIG. 2, on a dot sequential basis in the direction of the scanning line for each pixel. The color image signals are fed to the analog signal processing circuit 2, wherein they are amplified or filtered for the removal of a noise component. The output signals thus processed are converted by the A/D converter 3 to digital signals, which are applied to the pixel rearrangement circuit 4.

Figure 4:
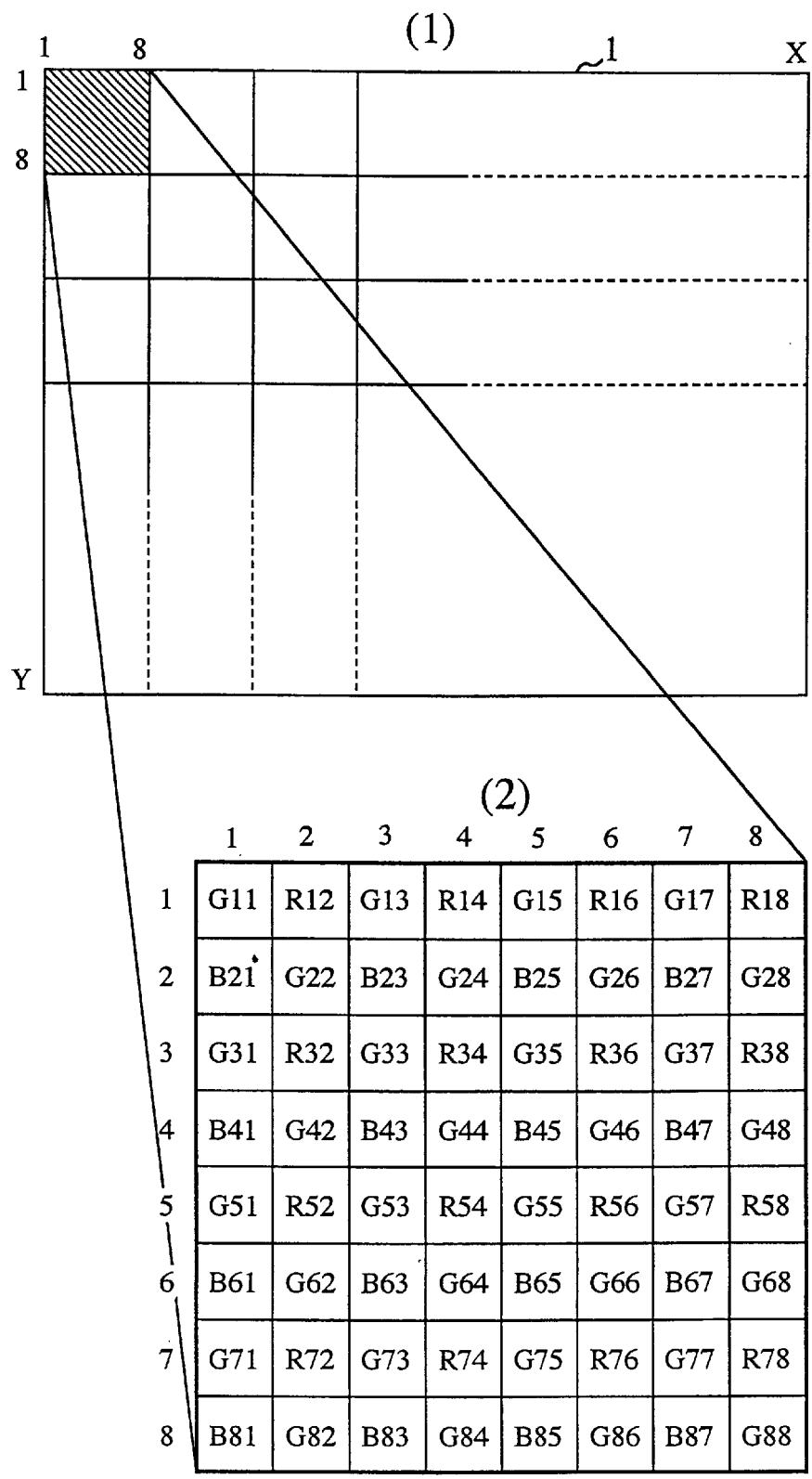
FIG. 4 is a diagram showing the state of a block in which pixels are rearranged by the pixel rearrangement circuit in Embodiment 1 of the present invention.

The pixel rearrangement circuit 4 performs the rearrangement of pixels by sequentially writing and transferring pieces of image data of one scanning line in one of the line buffers A41 and B42 in the direction of the scanning line and, at the same time, reading out image data from the other line buffer while changing the read address. FIG. 4 is a diagram showing the state of the block in which the pixel rearrangement is carried out. As depicted in FIG. 4(1), the frame or screen of the imaging device 1 is processed as divided into blocks, each formed from an 8 by 8 matrix of pixels, and image signals of the eight pixels in the vertical direction are input as a group of image signals into each of the line buffers A41 and B42.

FIG. 5 is a diagram showing the results of rearrangement by the pixel rearrangement circuit 4. The rearranged image signals are arranged with G components gathered at upper left- and lower right-hand addresses in the block, B components at lower left-hand addresses and R components at upper right-hand addresses.

Figure 6:
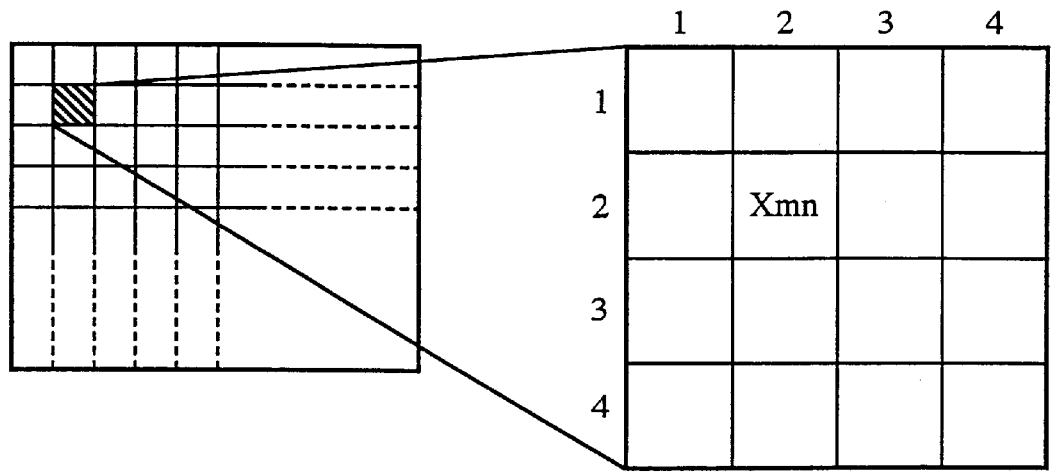
FIG. 6 is a diagram depicting an address which is used when a color image signal in the unit block rearranged by the pixel rearrangement circuit in Embodiment 1 of the present invention is encoded by a fixed-length coding circuit.

FIG. 6 is a diagram showing addresses for encoding, by the fixed-length coding circuit 5, the color image signals in the unit block rearranged by the pixel rearrangement circuit 4. That is, FIG. 6 shows the assignment of quantization levels, described later on, to image signals at m rows and n columns of addresses (where m and n are natural numbers, 0<m and n≦4) in the unit block that is a block formed from a 4 by 4 matrix of color image signals of the same color.

Figure 7:
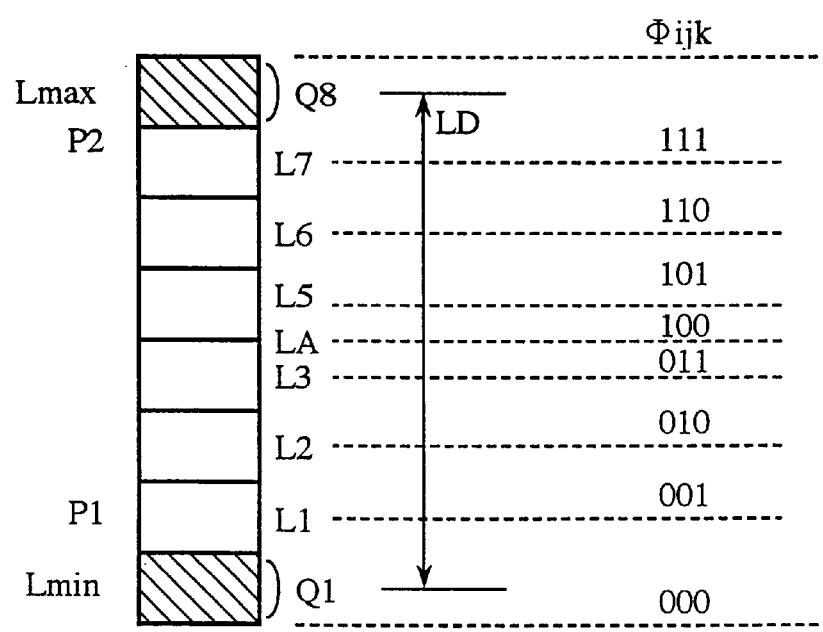
FIG. 7 is a diagram depicting quantization levels for layering or quantizing the intensity of the image signal of each pixel by the pixel rearrangement circuit in Embodiment 1 of the present invention.

FIG. 7 depicts the quantization level that is used to layer (quantize) the intensity of the image signal of each pixel after rearrangement by the pixel rearrangement circuit 4. In FIG. 7, Lmin is the minimum value of image signal intensity among the sixteen pixels depicted in FIG. 6; Lmax is the maximum value of image signal intensity among the four pixels; P1 is the lowest one of eight equally divided values of the pixel signal intensity between the maximum and minimum values Lmax and Lmin; P2 is the highest one of the eight equally divided values; Q1 is an average value of pixel signal intensity higher than Lmin but lower than P1; and Q8 is an average value of pixel signal intensity lower than Lmax but higher than P2.

Further, LD is a gray-scale span index in the unit block, which is equal to Q8−Q1. L1 to L7 are eight equally divided values of the gray-scale span index LD, which are arranged in increasing order of magnitude. LA is an average level of the image data in the unit block, which is equal to (Q1+Q8)/2. Φijk denotes quantization levels of each pixel.

Figure 8:
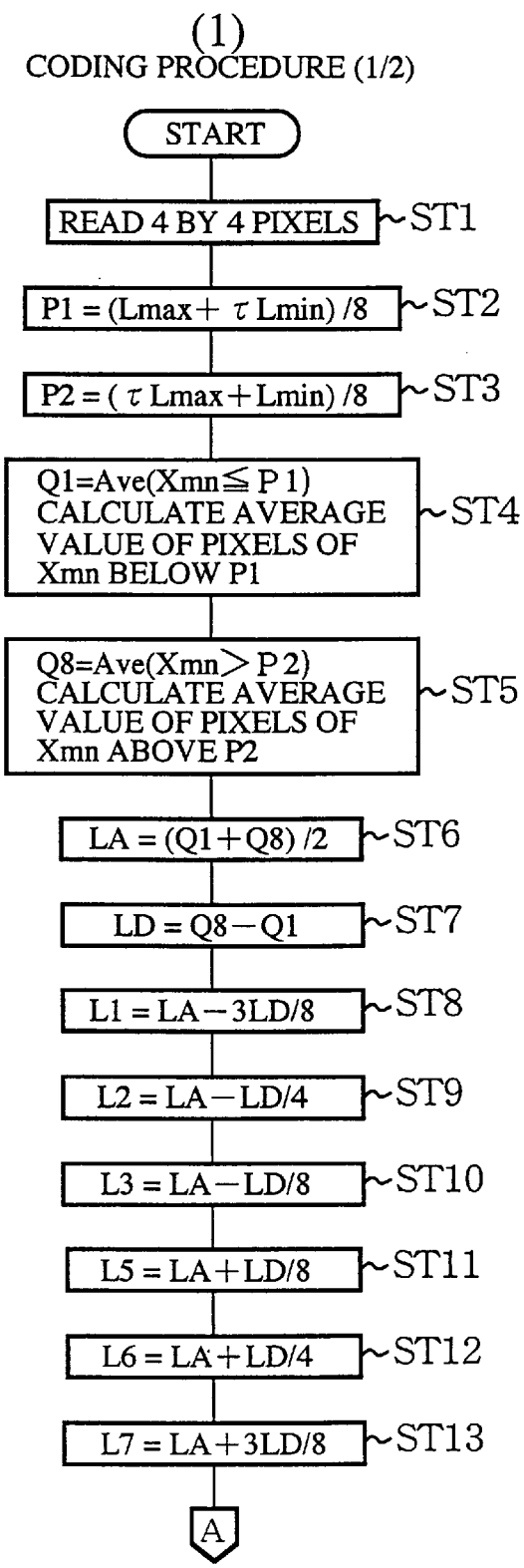
FIG. 8 is a flowchart showing the coding procedure in Embodiment 1 of the present invention.
Figure 9:
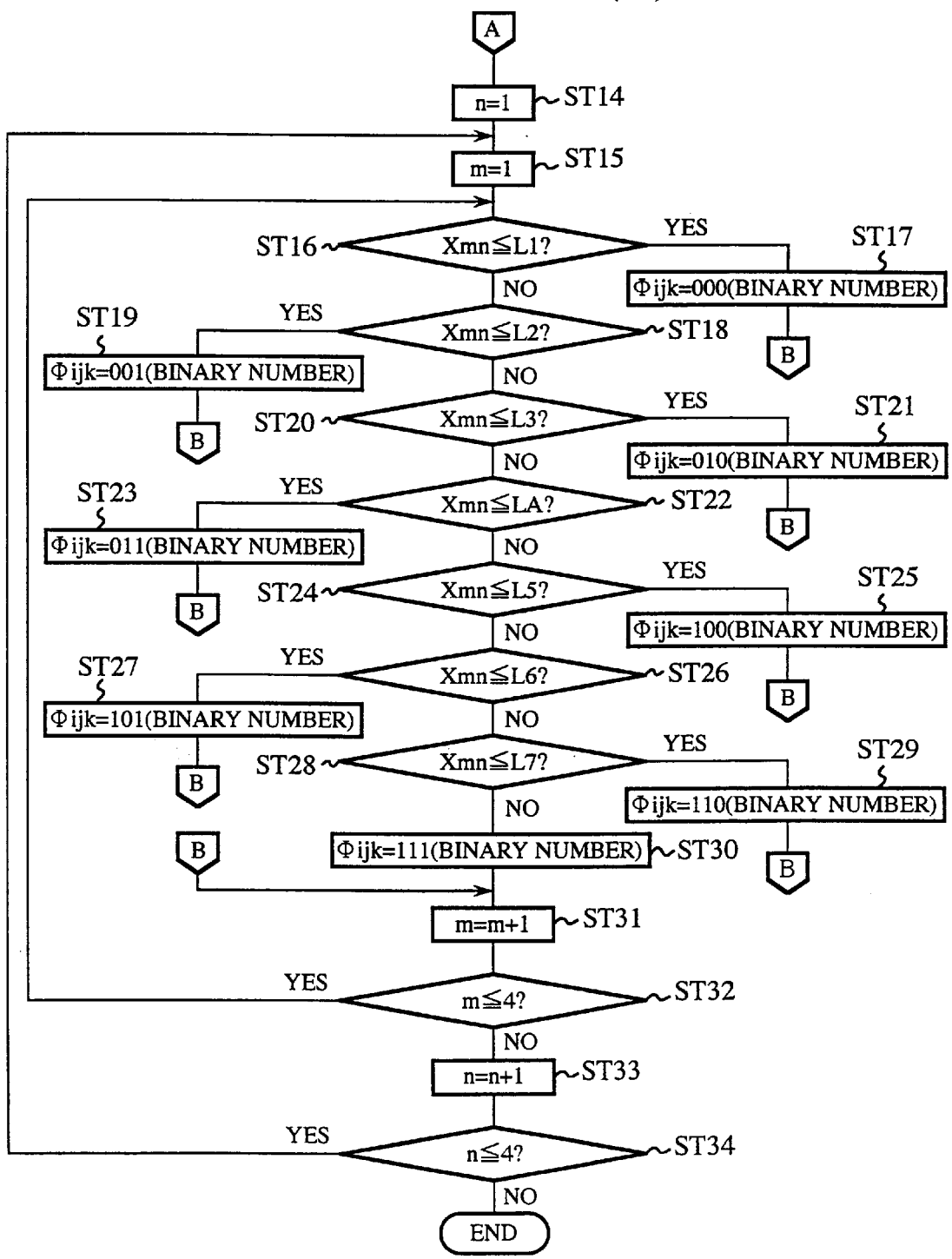
FIG. 9 is a flowchart showing the coding procedure in Embodiment 1 of the present invention.

FIGS. 8 and 9 are flowcharts showing coding procedure according to Embodiment 1 of the present invention. The coding procedure will be described below with reference to the flowcharts.

To begin with, the fixed-length coding circuit 5 reads thereinto image data in the unit block rearranged by the pixel rearrangement circuit 4 as depicted in FIG. 5(2) (step ST1). Next, the fixed-length coding circuit calculates the signal intensity of image data of the 4 by 4 pixels read thereinto, and calculates the values of P1, P2, Q1, Q8, LA, LD and L1 to L7 one after another using the following equations (steps ST2 to ST13).

$$P1=(L\max+7L\min)/8$$

$$P2=(7L\max+L\min)/8$$

$$Q1=Ave(X\mathrm{mn}\leq P1)$$

$$Q8=Ave(X\mathrm{mn}>P2)$$

$$LA=(Q1+Q8)/2$$

$$LD=Q8-Q1$$

$$L1=LA-3LD/8$$

$$L2=LA-LD/4$$

$$L3=LA-LD/8$$

$$L5=LA+LD/8$$

$$L6=LA+LD/4$$

$$L7=LA+3LD/8$$

The expression of Q1 means the calculation of an average value of the pixel signal intensity between Lmin and P1, and the expression of Q8 means the calculation of an average value of the pixel signal intensity between Lmax and P2.

After calculating the values P1, P2, Q1, Q8, LA, LD and L1 to L7 one after another as mentioned above, the fixed-length coding circuit 5 sets n=1 and m=1 (steps ST14 and 15) and makes a check to see if the pixel signal intensity (hereinafter referred to as a pixel value) Xmn (i.e. pixel value X11) at an address (m, n) is below L1 (step ST16).

When the pixel value X11 is smaller than L1, the quantization level Φijk of this pixel is set at 000 in binary notation (step ST17). Then, m is incremented by 1(step ST31) and a check is made to see if m is smaller than 4 (step ST32). If m is smaller than 4, the pixel value is compared again with L1 (step ST16).

When m is larger than 4, n is incremented by 1 (step ST33), and a check is made to see if the incremented n is smaller than 4 (step ST34). If n is smaller than 4, the pixel value is compared again with L1 (step ST16).

When the pixel value Xmn is larger than L1, a check is made to see if it is smaller than L2 (step ST18); when the pixel value Xmn is smaller than L2, the quantization level Φijk of this pixel is set at 001 in binary notation (step ST19). Next, m is incremented by 1 (step ST31), and a check is made to see if m is smaller than 4 (step ST32). If m is smaller than 4, the pixel value is compared again with L1 (step ST16). If m is larger than 4, n is incremented by 1 (step ST33), and a check is made to see if the incremented n is smaller than 4 (step ST34). If n is smaller than 4, the pixel value is compared again with L1 (step ST16).

Thereafter, a check is similarly made to determine which value the pixel value takes, between L1 and L2, between L2 and L3, between L3 and LA, between LA and L5, between L5 and L6, or between L6 and L7 (step ST16, ST18, ST20, ST22, ST24, ST26, ST28), and the quantization level $\Phi ijk=$ 000, 001, 010, 011, 100, 101, 110, 111 is assigned to the pixel concerned according to the pixel value (step ST17, ST19, ST21, ST13, ST25, ST27, ST29).

The quantization level is assigned to every pixel in the same unit block as mentioned above and then coding ends. The coded data of the unit block is LA, LD and $\phi ijk$ of each pixel.

These processes are repeated by the number of unit blocks forming the screen.

FIG. 10 is a diagram showing how image data of each unit block encoded by the fixed-length coding circuit 5 is stored in the coded image memory 6. The image data of one block rearranged by the pixel rearrangement circuit 4 as depicted in FIG. 10(1) is stored with coded data (indicated by e suffixed to the number of each image signal; for example, coded data of the image signal G1 is indicated by G1$e$) classified for each color as shown in FIG. 10(2). FIG. 11 depicts the state of storage of the coded data for each unit block over the entire image of one field.

FIG. 12 is a diagram showing the storage capacity necessary for storing in the coded image memory 6 the data coded by the fixed-length coding circuit 5.

As shown in the leftmost column of FIG. 12(1) and in the upper part of FIG. 12(2), when image data of one pixel is represented by 8 bits, the coded data is 8 bits (1 byte) for the average value level LA, 8 bits (1 byte) for the gray-scale span index LD, and 3 bits×16 pixels (the number of pixels in one unit block) and hence 48 bits (6 bytes) for the quantization level $\Phi ijk$; that is, a total of 64 bits (8 bytes) suffices per unit block. In contrast thereto, a storage capacity of 8×16=128 bits (16 bytes) is needed for storing uncoded original image data, and hence the data compression ratio is 1/2.

In the signal processing of the image signal, when the image data of one pixel in the output signal from the A/D converter 3 is 10-bit, a 10-bit storage capacity is needed to store the coded image data of one unit block in the case where a 2-byte storage capacity is prepared for each of the average value level LA and the gray-scale span index LD and no bits are packed, as shown in the central column of FIG. 12(1) and in the middle of FIG. 12(2). In this instance, the storage capacity necessary for storing the uncoded original image is 2 bytes×16 pixels=32 bytes, and the data compression ratio is 10/32 (When the uncoded original image is stored with bits packed, the data compression ratio is 10/(10×16/8)=10/20).

Further, as depicted in the rightmost column of FIG. 12(1) and in the lower part of FIG. 12(2), when a 3-byte storage capacity is prepared for each of the average value LA and the gray-scale span index LD and data of the average value level LA and data of the gray-scale span index LD are stored within the 3-byte capacity with bits packed, the storage capacity necessary for storing the coded data of one unit block is 9 bytes. In this case, the storage capacity necessary for storing the uncoded original image is 10 bits×16 pixels/ 8=20 bytes and the data compression ratio is 9/20 (In the case of storing the original image with no bits packed, the data compression ratio is 9/32).

FIG. 13 is a diagram showing the storage capacity necessary for storing image signals of one frame in the coded image memory 6 that conforms to VGA (Variable Graphics Array) Standard.

In this instance, the number of unit blocks in one frame is 640×480/(4×4)=19,200, and therefore, when image data of one pixel is represented by 8 bits, the memory capacity necessary for storing the average value level LA is 8 bits×19,200=153,600 bits (19,200 bytes), the memory capacity necessary for the gray-scale span index LD is 8 bits×19,200=153,600 bits (19,200 bytes), and the memory capacity necessary for the quantization level $\phi ijk$ is 48 bits×19,200=921,600 bits (115,200 bytes); thus, the memory capacity for storing coded data is a total of 1,228,800 bits (153,600 bytes). In contrast thereto, the memory capacity necessary for storing one frame of uncoded original image data is 128 bits×19,200=2,457,600 bits (307,200 bytes).

In the case where the image data of one pixel is represented by 10 bits and no bits are packed, the memory capacity for storing the average value level LA is 2 bytes× 19,200=38,400 bytes, the memory capacity for storing the gray-scale span index LD is 2 bytes×19,200=38,400 bytes, and the memory capacity for storing the quantization level $\Phi ijk$ is 6 bytes×19,200=115,200 bytes; hence, a total of 192,000 bytes is needed to store the coded data. In contrast thereto, the memory capacity necessary for storing one frame of the uncoded original image data is 32 bytes×19, 200=614,400 bytes.

In the case where the image data of one pixel is represented by 10 bits and bits are packed, the memory capacity necessary for storing the average value level LA and the gray-scale span index LD is 3 bytes×19,200=57,600 bytes and the memory capacity for storing the quantization level $\Phi ijk$ is 6 bytes=19,200=115,200 bytes; hence, a total of 172,800 bytes is needed to store the coded data. In contrast thereto, the memory capacity necessary for storing one frame of the uncoded original image data is 20 bytes=19, 200=384,000 bytes.

To reproduce and display image data obtained by rearranging color image signals for each color and encoding them by one line of coding circuit and storing the result in the coded image memory 6 in the image processor 14 as described above, the image data needs to be read out and decoded by the fixed-length decoding circuit 7.

Figure 14:
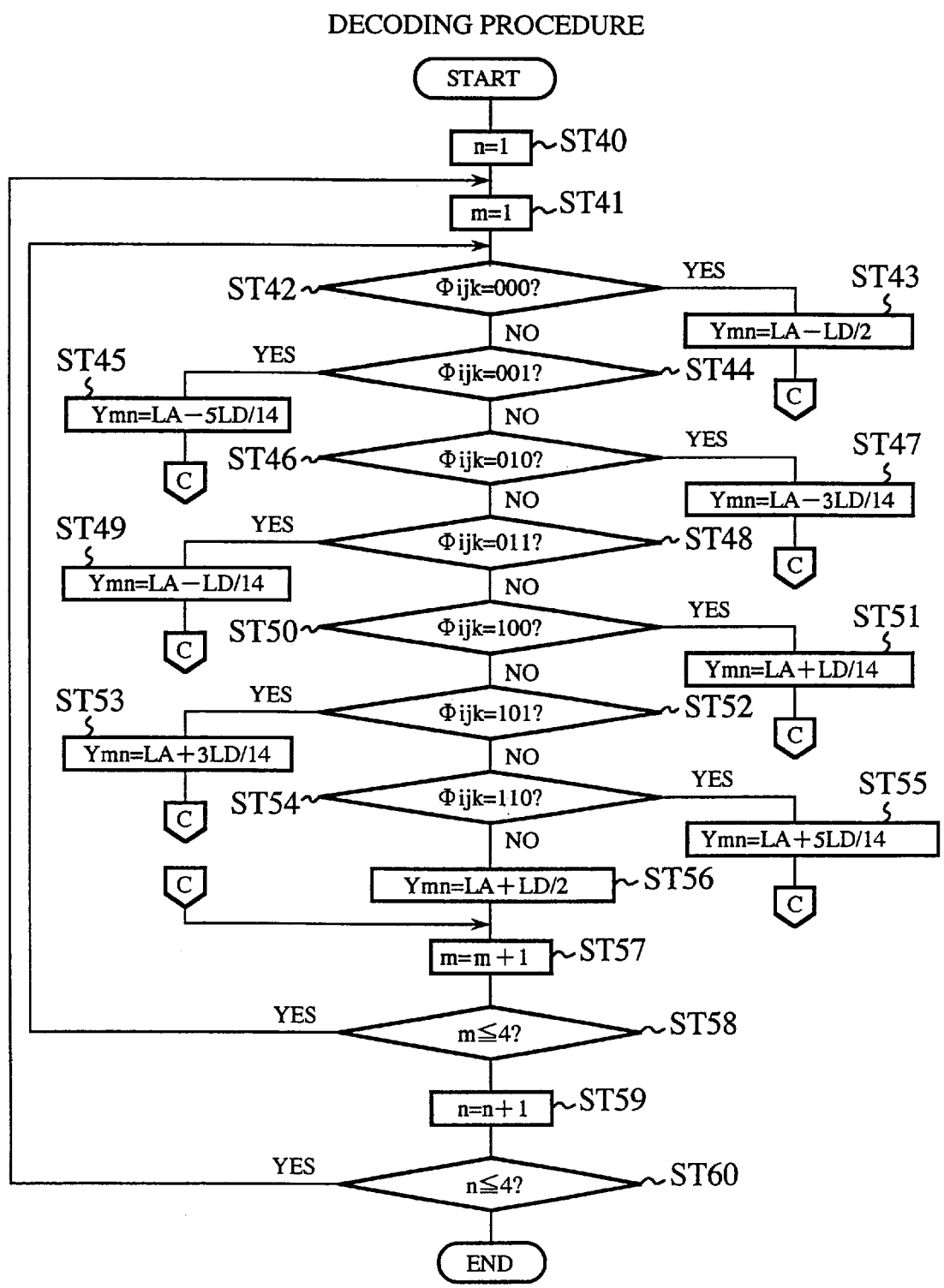
FIG. 14 is a flowchart depicting the operation of a fixed-length decoding circuit in Embodiment 1 of the present invention.

FIG. 14 is a flowchart depicting the operation of the fixed-length decoding circuit 7. A description will be given, with reference to this flowchart, of the fixed-length decoding operation of the fixed-length decoding circuit 7.

Upon starting the fixed-length decoding operation, the fixed-length decoding circuit 7 first sets the vertical coordinate value n to 1 (step ST40), and then sets the horizontal coordinate value m to 1 (step ST41). That is, the address at the coordinates (1, 1) in a certain unit block is specified by the operations of steps ST40 and 41.

Next, the fixed-length decoding circuit 7 checks the value of the quantization level $\Phi ijk$ of the specified address (step ST42, ST44, ST46, ST48, ST50, ST52, ST54), and calculates the signal intensity $Y_{mn}$ of the pixel ($Y_{11}$ at the coordinates (1, 1)) from the average value level LA and the gray-scale span index LD in accordance with the quantization level $\Phi ijk$ (step ST43, ST45, ST47, ST49, ST51, ST53, ST55, ST56).

The calculation of the signal intensity $Y_{mn}$ from the average value level LA and the gray-scale span index LD in the respective steps is conducted following the expressions listed below.

| | |
|---|---|
| Ymn = LA − LD/2 | (step ST43) |
| Ymn = LA − 5LD/14 | (step ST45) |
| Ymn = LA − 3LD/14 | (step ST47) |
| Ymn = LA − LD/14 | (step ST49) |
| Ymn = LA + LD/14 | (step ST51) |
| Ymn = LA + 3LD/14 | (step ST53) |
| Ymn = LA + 5LD/14 | (step ST55) |
| Ymn = LA + LS/2 | (step ST56) |

Having calculated the signal intensity of the pixel (1, 1), the fixed-length decoding circuit shifts its operation horizontally to the next pixel (step ST57, ST58) and decodes the signal intensity of the pixel (2, 1), using the same procedure as mentioned above (steps ST42 to ST56).

After decoding the signal intensities of the pixels in the uppermost row in the unit block (step ST58), the fixed-length decoding circuit increments the vertical coordinate value by 1 to shift its operation down to the next row (step ST59), and decodes the signal intensities of pixels in that row in the same fashion as described above (steps ST42 to ST58).

Having thus decoded the signal intensities of all the pixels in the unit block (steps ST41 to ST60), the fixed-length decoding circuit finishes the decoding operation.

Next, in the pixel reverse-rearrangement circuit 8 the data decoded by the fixed-length decoding circuit 7 is subjected to rearrangement processing reverse to that by the pixel rearrangement circuit 4, whereby the pixel signals are rearranged in the same sequence as that in which they were read out in the direction of the scanning line.

The image data restored by the pixel reverse-rearrangement circuit 8 to the original sequence is then subjected to various image processing by the signal processing circuit 9, such as pixel interpolation, gray scale correction and γ-correction.

The image signals thus arranged in the same dot sequence in the scanning-line direction as is the case with the original image signals and subjected to image processing are stored in the frame memory 10.

The image signals stored in the frame memory 10 are read out therefrom and displayed as an image on the display device 12, then they are subjected to signal compression again by the variable-length coding circuit 11 and stored in the secondary storage device 13.

As described above, according to this Embodiment 1, an imaging device capable of special readout therefrom of image signals need not be used as the imaging device 1, but an imaging device of the type that outputs image signals in ordinary dot sequence can be used; furthermore, image signals can be encoded using only color image signal data of each color in the block, and hence the encoding can be carried out without being affected by color image signal data of other colors. Additionally, this embodiment can be implemented using one line of coding circuit and a small capacity coded image memory.

Moreover, according to this Embodiment 1, since the image data is stored in the coded image memory after being signal-compressed, a large amount of image data can be stored in the coded image memory without increasing its capacity in particular—this brings about an effect that high-speed continuous shooting is possible.

Further, by increasing the number of pixels by a pixel interpolation or similar method after optically shifting images preceding and following continuously picked up images by 1/c (where c is an integer equal to or greater than 2) pixels, it is possible to produce high definition images, the same effect as is obtainable with a c-fold increase in the resolution of the imaging device 1. In this instance, since shorter time intervals of image frames by continuous shooting will lessen the influence of external disturbances such as motions of the subject, this Embodiment 1 will deliver its performance that high-speed continuous shooting can be achieved.

While in this Embodiment 1 the processing by each of the fixed-length decoding circuit 7, the pixel reverse-rearrangement circuit 8, the signal processing circuit 9 and the variable-length coding circuit 11 is implemented by hardware, the processing may also be performed by software since it is not necessarily required to be real-time processing. Software processing is advantageous over hardware processing in terms of versatility, flexibility and costs. In the case of using hardware to perform the operations of the fixed-length decoding circuit 7, the pixel reverse-rearrangement circuit 8, the signal processing circuit 9 and the variable-length coding circuit 11, the frame memory 10 need not always be provided, in which case the coded image memory 6 can be made to perform the function of the frame memory 6. That is, the use of the fixed-length coding system also brings about the effect of eliminating the frame memory 10.

Furthermore, although this Embodiment 1 encodes color image signals through the use of eight equally divided values of the gray-scale span index LD, the quantization level φijk may also be changed for each color. For example, the quantization level may be divided into eight levels of three bits for G and four levels of two bits for both of R and B. It is also possible to divide the quantization level into four levels of two bits for G and two levels of one bit for R and B; the quantization level may be chosen to be four-bits or more. That is, by selecting the number of quantization levels to be large for a color signal which contains much resolution information whose quantity deterioration is noticeable and by selecting the number of quantization levels to be small small for a color signal whose quality deterioration is not noticeable, the total amount of codes can be suppressed by minimizing the quality deterioration of the entire picture.

The arrangements of unit blocks in the block formed from an 8 by 8 matrix of pixels, depicted in FIGS. 4, 5 and 10, are intended as being merely exemplary; it is a matter of course that other arrangements can be adopted. The fixed-length coding system is also exemplary, and the same results as described above could be obtained even if different methods are employed for calculating threshold values and quantization levels. What matters in the coding system of the present invention resides in that the coding is completed in the block and that the coding length is fixed.

In the case where only unit blocks are rearranged substituting the signal intensity of every pixel in each unit block with the average value level LA and images are displayed using, for example, a luminance signal, the resolution of the display image drops to $\frac{1}{16}$, but since decoding and rearrangement of the pixel data in the blocks are not required, an extremely high-speed image display can be achieved. In addition, if the unit blocks are each processed as one pixel image signal having an intensity of the average value level LA, an image picked up as an image of one frame can be displayed in a size of $\frac{1}{16}$ that of the display screen of the display device 11—this permits a multi-frame display with 16 frames. While this multi-frame display is low in the accuracy of color information and resolution information on each display image, it is suitable for use in the case where sketchy information on the image contents will suffice; in particular, in a system wherein the decoding and the subsequent processing are performed using software, this display scheme can be used as a display mode whose processing time is short.

EMBODIMENT 2

Figure 15:
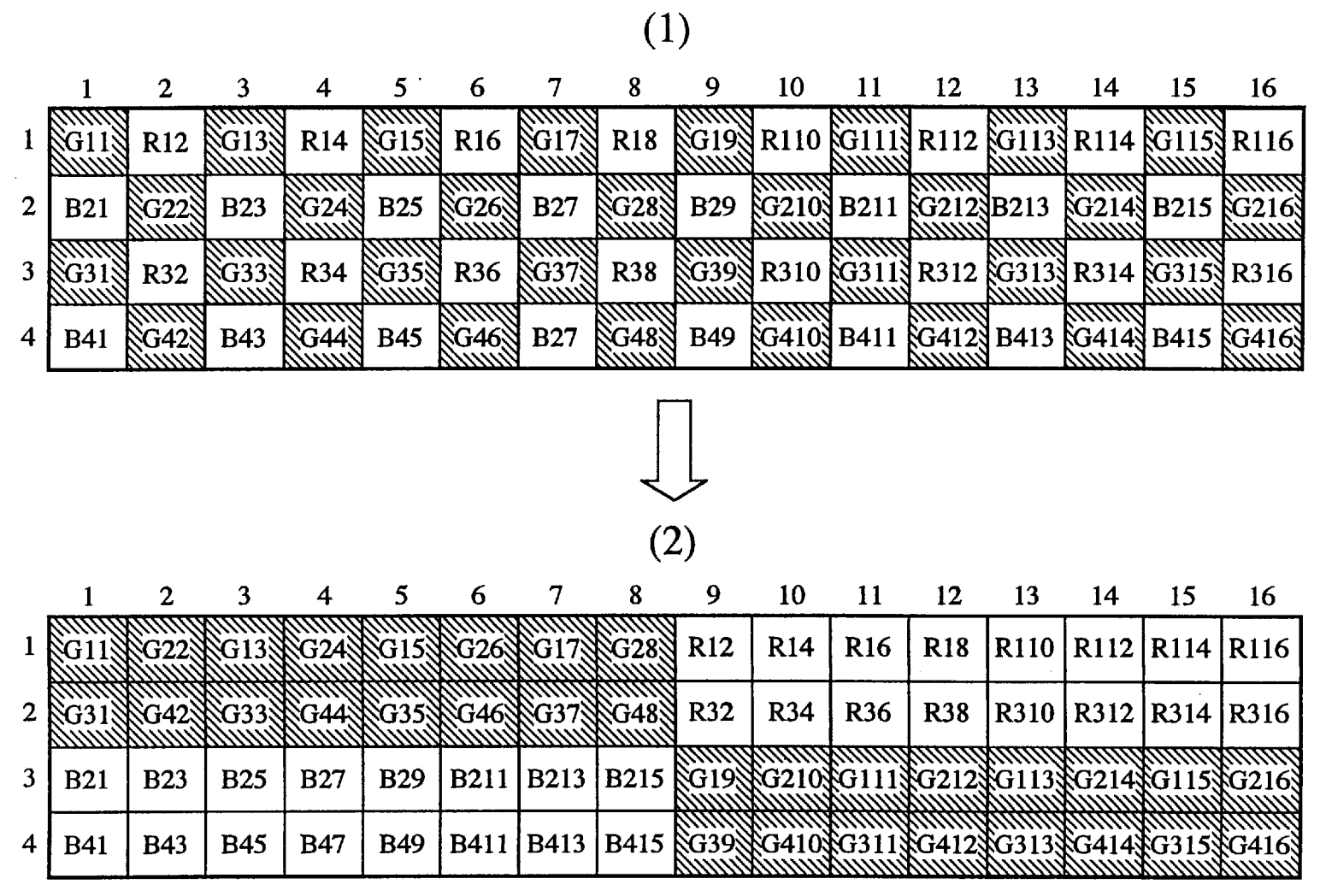

FIG. 15 is a diagram showing the results of rearrangement of color image data in the line buffers of the rearrangement circuit of the static image pick-up device according to Embodiment 2 of the present invention. The other parts of this Embodiment 2 are the same as those of Embodiment 1, and hence they will not be described.

In this Embodiment 2, the unit block is formed by 2 by 8 pixels, and the line buffers need only to have four lines each; hence, no large capacity is needed for them. The fixed-length coding/decoding processing is the same as in Embodiment 1 except that the pixel reference position in the unit block (coordinate calculation) differs from the reference position in the case where the unit block is formed from the 4 by 4 matrix of pixels.

EMBODIMENT 3

Figure 16:
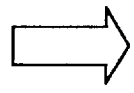
FIG. 16 is a diagram showing the results of rearrangement of color image data in a line buffer of a rearrangement circuit of a static image pick-up device according to Embodiment 3 of the present invention.

FIG. 16 is a diagram showing the results of rearrangement of color image data in the line buffers of the rearrangement circuit of the static image pick-up device according to Embodiment 3 of the present invention. The other parts of this Embodiment 3 are the same as those of Embodiment 1, and hence they will not be described.

In this Embodiment 3, the unit blocks of the R and B signals are each formed by 2 by 8 pixels, whereas the unit block of the G signal whose quality deterioration is noticeable is formed by 4 by 4 pixels.

According to this Embodiment 3, two lines of coding/decoding are required corresponding to two kinds of unit block sizes (4 by 4 and 2 by 8), but as is the case with Embodiment 2, the line buffers need only to have four lines each; hence, no large capacity is needed for them. Furthermore, since the G signal whose quality deterioration is noticeable is processed as the 4 by 4 unit block, it is possible to obtain a display image of suppressed quality deterioration.

EMBODIMENT 4

Figure 17:
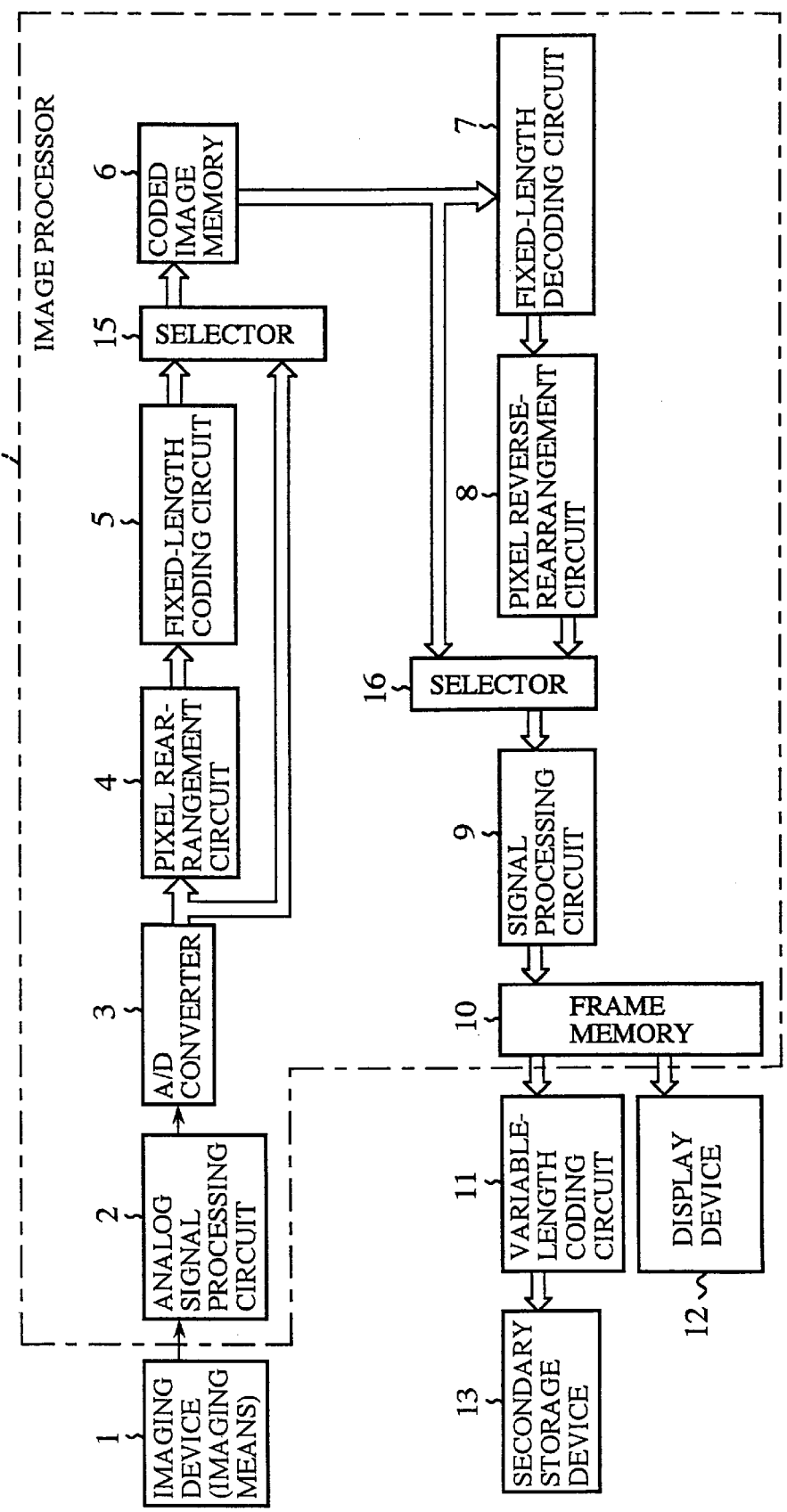
FIG. 17 is a block diagram illustrating a static image pick-up device according to Embodiment 4 of the present invention.
Figure 18:
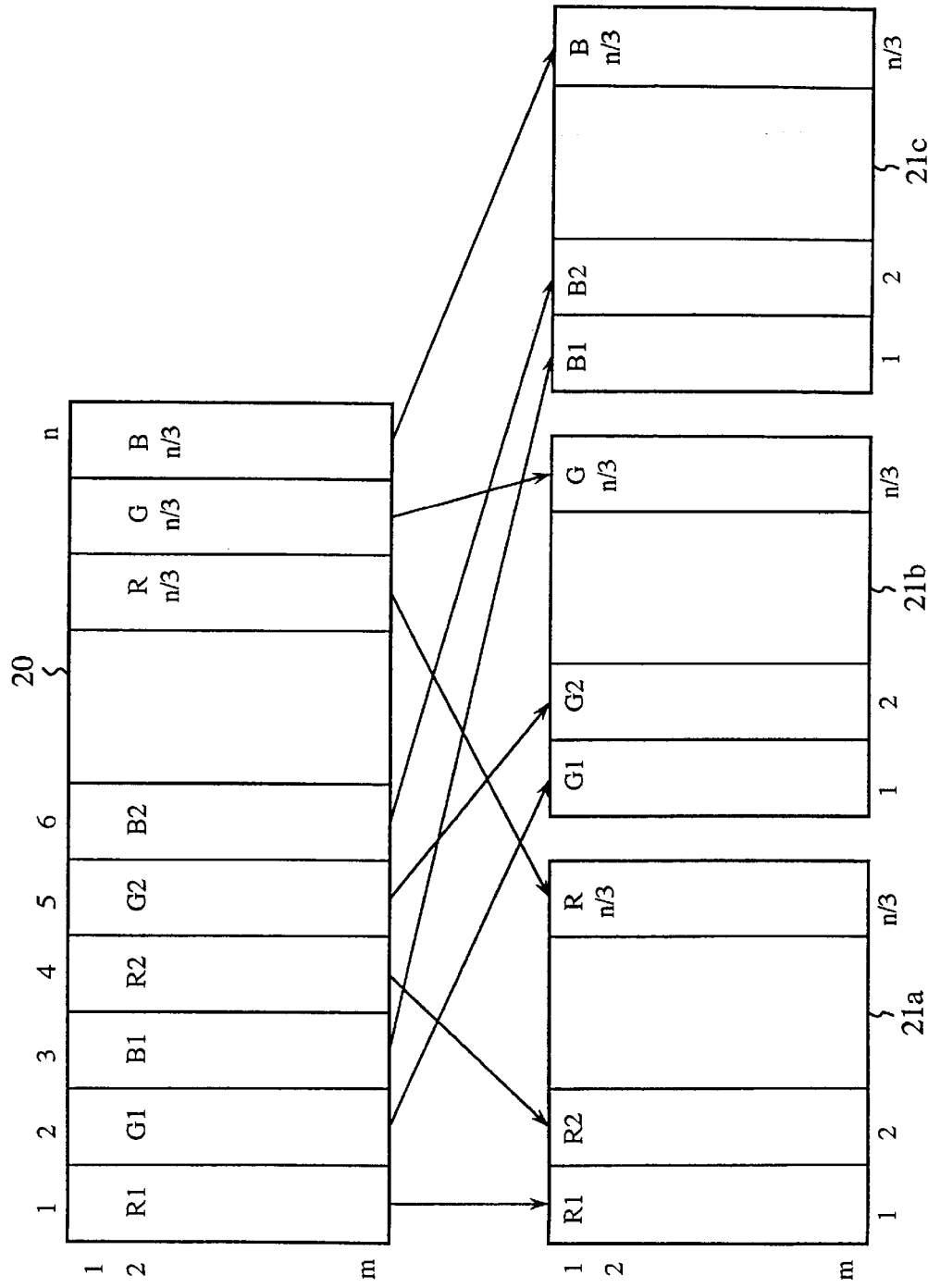
FIG. 18 is a diagram showing a color signal extracting method used in a conventional static image pick-up device.

FIG. 17 is a block diagram illustrating a static image pick-up device according to Embodiment 4 of the present invention. In FIG. 17 the same components as those in the static image pick-up device of Embodiment 1 shown in FIG. 1 are marked with the same reference numerals, and no description will be given of them.

In FIG. 17, reference numerals 15 and 16 denote selectors which select and output one of plural input signals thereto.

In this Embodiment 4 the selectors 15 and 16 are provided which selectively output their input signals, by which it is possible to select an operation involving the fixed-length coding and an operation not involving it.

When no fixed-length coding is performed, image signals of one frame are stored in the coded image memory 6, which permits the usage suitable for not particularly high-speed shooting. In the case of performing the fixed-length coding with a compression ratio of, for example, 10/20, image signals of two frame can be stored in the coded image memory 6 of the one-frame capacity, permitting high-speed continuous shooting. In the case of reading out the fixed-length coded image data for display, the read-out image data is subjected to fixed-length decoding by the fixed-length decoding circuit 7 and then to pixel reverse-rearrangement by the pixel reverse-rearrangement circuit 8.

In this Embodiment 4, the number of frames of continuous shooting could be increased by increasing the capacity of the coded image memory 6 or providing a floppy disk, hard disk, or similar memory in association with the coded image memory. Since the access speed for the floppy disk, hard disk, or like memories is usually lower than in the case of semiconductor memories, it is difficult to directly store output signals, which are provided at high speed from the imaging device 1, in such a memory as mentioned above; however, the fixed-length coding of the image signal reduces the amount of data involved and lowers the apparent transfer rate accordingly, allowing ease in storing the output signals from the imaging device in the floppy disk, hard disk or similar memory. Thus, this embodiment is suitable for use in the case where at least continuous capture of many images is given priority over image processing and display.

According to this Embodiment 4, it is possible to change the display system on the display device 1, depending on whether high-sped continuous shooting takes place or not.

While the above embodiments have been described to use the R-G-B series of image signal series as those to be coded, the present invention is equally effective in image processing of other series of image signals such as complementary and luminance signals, too. Further, although the image processor has been described as being applied to a static image pick-up device as a still camera, the field of its application is not limited specifically thereto but it is also applicable to devices which generate output signals of a predetermined number of pixels having a plurality of color components intermixed therein, such as a facsimile, a copier and a printer.

INDUSTRIAL APPLICABILITY

As described above, the image processor, the static image pick-up device and the image processing method according to the present invention are suitable for the implementation of high-speed continuous shooting and high-definition, high-speed reproduction through the use of an ordinary imaging device and a small capacity memory in a device of the type that compresses image signals having a plurality of color components by encoding and stores them in a memory.

What is claimed is:

1. An image processing system comprising:
   a pixel arranger sequentially operating on plural blocks representing an image signal to obtain plural sub-blocks from each block of said plural blocks, said each block including plural pixels having different basic colors, each sub-block of said plural sub-blocks consisting of plural pixels having the same basic color; and
   a coder operatively connected to said pixel arranger and sequentially encoding said plural sub-blocks obtained from said each block.

2. The image processing system as in claim 1, wherein said pixel arranger sequentially operates on plural portions of said each block, each portion of said plural portions containing plural pixels.

3. The image processing system as in claim 2, wherein said pixel arranger includes two line buffers, each line buffer having 2m lines, wherein m is 2a, wherein a sub-block is a pixel block with m rows and n columns, and wherein a and n are natural numbers.

4. The image processing system as in claim 2, wherein red and blue sub-blocks are pixel blocks with a rows and 2n columns and a green sub-block is a pixel block with 2a rows and n columns, wherein a and n are natural numbers, wherein said pixel arranger includes two line buffers, each line buffer having 2a lines.

5. The image processing system as in claim 2, wherein said pixel arranger includes two line buffers, each line buffer having 2m lines, wherein a sub-block is a pixel block with m rows and n columns, wherein m and n are natural numbers.

6. The image processing system as in claim 5, wherein m is 4.

7. The image processing system as in claim 1, wherein said coder is a fixed-length coder.

8. The image processor as in claim 7, wherein said fixed-length coder performs fixed-length coding at different compression ratios for each color.

9. The image processing system as in claim 7, said system further comprising:
a selector operatively connected to said coder and permitting the selection of outputting one of fixed-length coded and non-fixed-length coded image signals.

10. The image processing system as claimed in claim 7, said system further comprising:
fixed-length decoder having an input receiving image signals coded by said coder, said decoder outputting decoded image signals; and
pixel reverse-arranger operatively connected to said decoder, said reverse-arranger operating on the decoded image signals by reversing the operation on the pixels performed by said pixel arranger.

11. The image processing system as in claim 10, said system further comprising a frame memory storing said decoded image signals operated on by said reverse-arranger.

12. The image processing system as in claim 10, said system further comprising a display device displaying said decoded image signals operated on by said reverse-arranger.

13. The image processing system as in claim 12, said system further comprising a processor that reads out only part of the fixed-length coded image signals to display it on said display device without decoding it.

14. An image processor comprising:
pixel rearrangement means for rearranging image signals of predetermined number of pixels composed of a plurality of color components intermixed into a set of unit blocks, each consisting of image signal components of a same color;
fixed-length coding means for encoding the image signals rearranged by said pixel rearrangement means into fixed-length codes for each unit block; and
a coded image memory for storing the image signals encoded by said fixed-length coding means into fixed-length codes,
wherein the pixel rearrangement means comprises two line buffers, each having 2m lines, when the unit block is formed as a pixel block with m rows and n columns (where m and n are natural numbers), and
wherein m is 2a (where a is a natural number), and wherein the pixel rearrangement means rearranges the red and blue image signals so that the unit block has a rows and 2n columns.

15. The image processor as in claim 14, wherein the pixel rearrangement means rearranges the green image signal so that the unit block has 2a rows and n columns.

16. A static image pick-up device comprising:
single-plate, or single-tube, image sensor provided with color filters of plural colors and picking up an image of a subject to output an image signal having a plurality of color components intermixed therein;
a pixel arranger operatively connected to said image sensor, said arranger pixel arranger sequentially operating on plural blocks representing said image signal to obtain plural sub-blocks from each block of said plural blocks, said each block including plural pixels having different basic colors, each sub-block of said plural sub-blocks consisting of plural pixels having the same basic color; and
a coder operatively connected to said pixel arranger and sequentially encoding said plural sub-blocks obtained from said each block.

17. The static image pick-up device as in claim 16, wherein said pixel arranger sequentially operates on plural portions of said each block, each portion of said plural portions containing plural pixels.

18. The static image pick-up device as in claim 17, wherein said coder is a fixed-length coder.

19. The static image pick-up device as in claim 18, said static image pick-up device further comprising:
fixed-length decoder having an input receiving image signals coded by said coder, said decoder outputting decoded image signals; and
pixel reverse-arranger operatively connected to said decoder and restoring the image signals decoded by said decoder to an original image by undoing the effect of said pixel arranger operating on said plurality of blocks.

20. The static image pick-up device as in claim 19, said static image pick-up device further comprising a frame memory storing said decoded image signals restored by said reverse-arranger.

21. An image processing method comprising the steps of:
obtaining an image signal including at least one image, said at least one image encoded as plural blocks;
operating sequentially on said plural blocks to obtain plural sub-blocks from each block of said plural blocks by ordering pixels, said each block including plural pixels having different basic colors, each sub-block of said plural sub-blocks consisting of plural pixels having the same basic color; and
encoding sequentially said each sub-block into fixed-length codes.

22. The image processing method as in claim 21, wherein said operating step sequentially operates on plural portions of said each block, each portion of said plural portions containing plural pixels.

23. The image processing method as in claim 22, wherein said encoding step sequentially encodes said each sub-block into fixed-length codes.

24. An image processor comprising:
an input receiving an image signal having m by n array of pixels of different basic colors;
a pixel arranger operatively connected to said input and obtaining plural blocks from said m by n array of pixels, each block of said plural blocks having i by j pixels of different basic colors, said pixel arranger sequentially operating on said each block to generate plural sub-blocks from said each block, each sub-block of said plural sub-blocks consisting of plural pixels having the same basic color; and
an output operatively connected to said pixel arranger and sequentially outputting said each sub-block generated by said pixel arranger.

25. The image processor of claim 24, wherein said pixel arranger sequentially operates on plural portions of said each block to generate said plural sub-blocks, each portion of said plural portions containing plural pixels.

26. The image processing method as in claim 24, said image processing method further comprising the steps of:
decoding said encoded sub-blocks; and
restoring an original image by reversing the order of operations of said step of operating by arranging.

* * * * *